Nov. 11, 1952     D. JOHNSON     2,617,495
LUBRICATION APPARATUS
Filed May 4, 1950
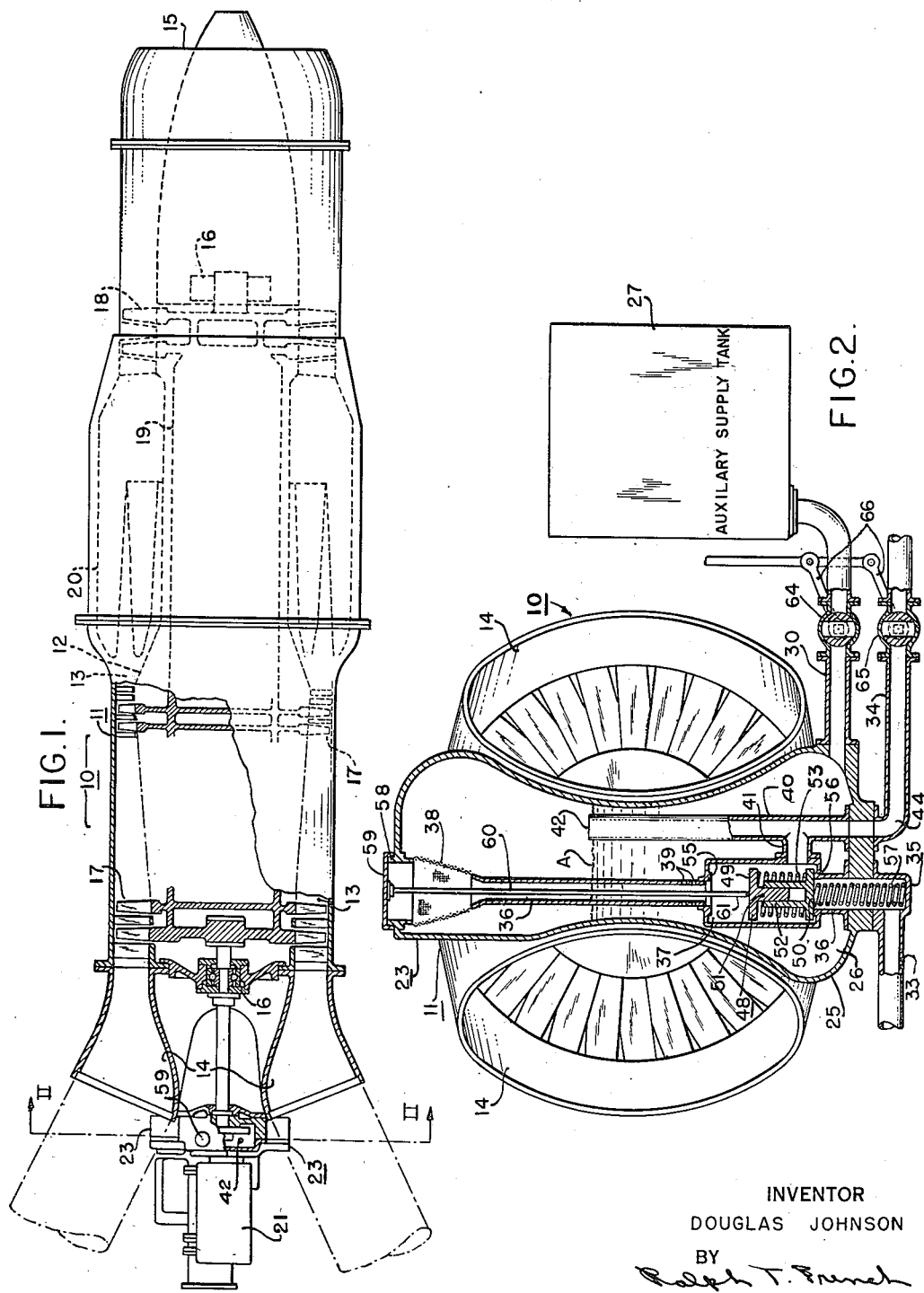
INVENTOR
DOUGLAS JOHNSON
BY
ATTORNEY Patented Nov. 11, 1952

2,617,495

UNITED STATES PATENT OFFICE 2,617,495

LUBRICATION APPARATUS

Douglas Johnson, Ridley Park, Pa., assignor to Westinghouse Electric Corporation, East Pittsburgh, Pa., a corporation of Pennsylvania Application May 4, 1950, Serial No. 160,039

2 Claims. (Cl. 184—1)

This invention relates to lubrication of aviation power plants, and more particularly to an oil sump or gear box for an aviation gas turbine engine.

It has been proposed to provide a gear box to house the driving elements for the engine driven accessory devices usually associated with an aviation gas turbine power plant, together with an external oil tank or reservoir to supplement the relatively limited volume of the oil sump of the gear box.

It is desirable to prevent overfilling of the gear box sump not only during servicing of the engine on the ground, but also in case it becomes necessary to effect replenishing supply of oil in the gear box from the supplementary or auxiliary tank during flight. Any overflow of oil should be safely conducted overboard through the overflow conduits provided for that purpose. It is an object of this invention to provide overflow valve means constructed and arranged to facilitate proper maintenance of the desired oil level in such a gear box.

Another object of the invention is the provision of oil supply control valve means serving to prevent overfilling of the gear box in order to avoid the possibly dangerous consequences incident to the presence of excess oil in the engine during flight.

A further object is to provide an improved overflow valve apparatus adapted to be actuated by an element carried by the filler cap of the gear box sump.

These and other objects are effected by the invention as will be apparent from the following description and claims taken in connection with the accompanying drawing, forming a part of this application, in which:

Fig. 1 is a schematic top view of a typical aviation power plant equipped with lubricant supply means constructed in accordance with the invention.

Fig. 2 is a diagrammatic vertical sectional view, taken substantially along the line II—II of Fig. 1, of the gear box and an auxiliary oil supply equipped with valve means constructed in accordance with the invention.

As shown in Fig. 1 of the drawing, the aviation power plant may comprise a turbojet 10 having a substantially cylindrical outer casing 11 and a sectional core structure 12 disposed axially therein for providing an annular fluid flow passage 13, which extends through the engine from a bifurcated inlet duct 14 to a discharge nozzle 15. A pair of bearings 16 are suitably mounted in the core structure 12 for supporting a rotor aggregate, which comprises the rotor of an axial-flow compressor 17 and that of a turbine 18 having a common shaft 19. Disposed between the compressor and turbine is an annular combustion apparatus 20 to which fuel is supplied by way of a plurality of nozzles (not shown). Engine accessory devices, such as oil pumps, fuel pumps and the usual governor, indicated generally at 21 in Fig. 1, are adapted to be driven by the rotor aggregate through the medium of suitable driving gears operatively mounted in a gear box 23, which is disposed forwardly of the compressor adjacent the branches of the bifurcated inlet duct 14.

In operation, air entering by way of the inlet duct 14 is compressed by the compressor 17 and supports combustion of fuel in the combustion apparatus 20. Hot motive fluid thereby generated is expanded through the turbine 18 and is finally discharged through the nozzle 15 in the form of a jet providing a propulsive thrust.

The gear box 23, as best shown in vertical section in Fig. 2, comprises a casing 25 having an oil sump portion 26, in which oil is maintained at a suitable level, as indicated by a dotted line A, for lubrication of the gears and other operating parts (not shown) in the gear box. For ensuring an adequate supply of oil, a supplementary oil reservoir 27 may be mounted exteriorly of the engine envelope or casing structure 11 on or somewhat above the same horizontal level as that in which the sump portion 26 is normally maintained during flight. A conduit 30 is provided for establishing communication between the lowermost portions of the reservoir 27 and the gear box 23 below the desired level of oil in the sump portion 26.

According to the invention, the lower sump portion of casing 26 of the gear box 23 is provided with a pair of overboard pipes 33 and 34, through either of which excess oil may be safely discharged overboard the aircraft under different conditions, as hereinafter explained. The overboard pipe 33 communicates through an elbow portion 35 with a vertically disposed filler tube 36 having an enlarged valve chamber 37 formed below the oil level A and intermediate the elbow portion 35 and a top filler screen 38, which is suitably mounted below an aperture formed in the upper end of the gear box casing 25. A number of ports 39 are formed in the tube 36 adjacent the upper end of the valve chamber 37. The valve chamber 37 communicates with a vertically arranged oveflow pipe 40 through a lateral conduit 41, which is connected to the valve chamber intermediate the lower and upper ends thereof. The upper open end 42 of the overflow pipe 40 terminates substantially at the desired level A of the oil in the gear box. The lower end of the overflow pipe 40 communicates through an elbow portion 44 with the overboard pipe 34.

Operatively disposed in the valve chamber 37 is a yieldable valve assembly 48, comprising upper and lower valve elements 49 and 50 having complementary stems 51 and 52, respectively, which are slidably engaged or telescoped together. A coil spring 53 is fitted over the telescoping stems 51 and 52 for yieldably resisting movement of one of the valve elements toward the other. The upper wall of the valve chamber 37 constitutes an annular seat 55 engageable by the valve element 49 when the valve assembly 48 is shifted upwardly. A similar seat 56 is formed on the lower wall of the valve chamber for engagement with the valve element 50 when the valve assembly is in the lower position illustrated. A coil spring 57 is interposed between the lower face of valve element 50 and the elbow portion 35 of the pipe 33, for urging the valve assembly 48 away from seat 56.

The filler screen 38 is surmounted by an annular collar element 58 secured in the opening of the casing 23 and upon which a filler cap 59 is adapted to be detachably engaged for closing the upper end of the filler tube 36. Welded or otherwise secured to the inner side of the filler cap 59 is one end of an elongated rod 60, the lower end 61 of which is adapted to be brought into engagement with the valve element 49 upon insertion thereof into the filler tube 36 for attaching the filler cap 59 to the collar element 58. The length of the rod 60 is such that, upon engagement of the cap 59 with the collar 58, the valve assembly 48 is held in its lowermost position, with valve element 50 seated on the annular seat 56.

To fill the gear box sump 26 with oil, the operator removes filler cap 59 and rod 60, and pours a suitable quantity of oil through the opening defined by the collar 58, the oil flowing through screen 38 into the sump 26. Upon removal of the rod 60, the valve assembly 48 is shifted upwardly by spring 57 until valve element 49 engages seat 55. Oil entering the tube 36 is free to flow to the sump 26 by way of ports 39. Any excess oil above level A is then discharged by flow through the overflow pipe 40, passage 41, the lower end of tube 36 and the overboard pipe 33. When the filling operation has been accomplished, the cap 59 and rod 60 are reapplied, bringing the valve assembly 48 back to the illustrated position for cutting off flow to the overboard pipe 33.

For controlling the supply of additional oil from the auxiliary tank 27 to the gear box sump 26 during flight of the aircraft carrying the turbojet 10, a pair of valves 64 and 65 are interposed in the respective pipes 30 and 34, and may be operatively connected to a common actuating linkage 66. Both valves 64 and 65 are normally maintained in closed position, as shown in Fig. 2. If it is desired to effect supply of oil from the tank 27 to the sump 26 in order to replenish that used up in operation of the engine, the linkage 66 is actuated to open both valves 64 and 65, whereupon oil is supplied by gravity flow to the sump 26, any excess oil being free to overflow through the pipe 40 and overboard pipe 34.

From the foregoing, it will be apparent that the improved arrangement of the gear box equipped with an automatic valve apparatus corresponding to that described may readily be employed with an aviation power plant of any desired type to prevent overfilling with oil, and may be installed in existing apparatus without involving extensive modifications or material expense.

While the invention has been shown in but one form, it will be obvious to those skilled in the art that it is not so limited, but is susceptible of various changes and modifications without departing from the spirit thereof.

What is claimed is:

1. In a gear box structure having an oil sump chamber, in combination, a filler tube having a filler opening communicating with said chamber and including an apertured portion and a lower portion, said lower portion having an upper valve seat and a lower valve seat defining an overboard communication through which excess oil can be discharged from said chamber, a vertically disposed overflow pipe communicating at its lower end with the lower portion of said filler tube and having an upper inlet defining a predetermined maximum oil level in said chamber, a valve assembly movably mounted in said lower portion of said filler tube and engageable with said lower valve seat for closing said overboard communication, a spring biasing said valve assembly away from said lower valve seat toward engagement with said upper valve seat to close communication between the apertured and lower portions of said filler tube, and a removable closure member adapted to be detachably mounted on the gear box structure in covering relation with said filler opening and having a rod adapted to extend through said filler tube to hold said valve assembly in engagement with said lower valve seat in opposition to the biasing force of said spring.

2. The combination with casing structure having an oil sump chamber and a top filler opening therefor, of a vertical overflow pipe having an open lower end and mounted in said chamber in offset relation to said filler opening, a valve seat and discharge outlet disposed below said filler opening, valve means movable in one direction into engagement with said valve seat to close communication between said discharge outlet and the lower end of said overflow pipe and movable in another direction to open such communication for discharging excess oil, said valve means comprising a pair of slidably engaged complementary valve elements and a spring interposed therebetween, a tube surrounding said valve means and having another valve seat opposite the first-named valve seat, a second spring engaging one of said valve elements for biasing said valve means toward said open position while the other of the valve elements engages said other valve seat, a removable rod adapted to extend through said filler opening with one end in operative engagement with one of said valve elements for yieldably holding the other valve element in engagement with the first-named valve seat, and a filler cap member secured to the other end of said rod and adapted to be detachably mounted on said casing structure in closing relation with said filler opening, the first-named spring between said valve elements being yieldable to facilitate mounting of said cap member with said rod in abutting relation with said valve assembly.

DOUGLAS JOHNSON.

REFERENCES CITED

The following references are of record in the file of this patent:

UNITED STATES PATENTS

| Number | Name | Date |
|---|---|---|
| 1,401,081 | Howard | Dec. 20, 1921 |

FOREIGN PATENTS

| Number | Country | Date |
|---|---|---|
| 244,945 | Great Britain | Dec. 31, 1925 |